2 Sheets—Sheet 1.
S. J. CHAPMAN.
Bale-Band Tighteners.
No. 196,431. Patented Oct. 23, 1877.
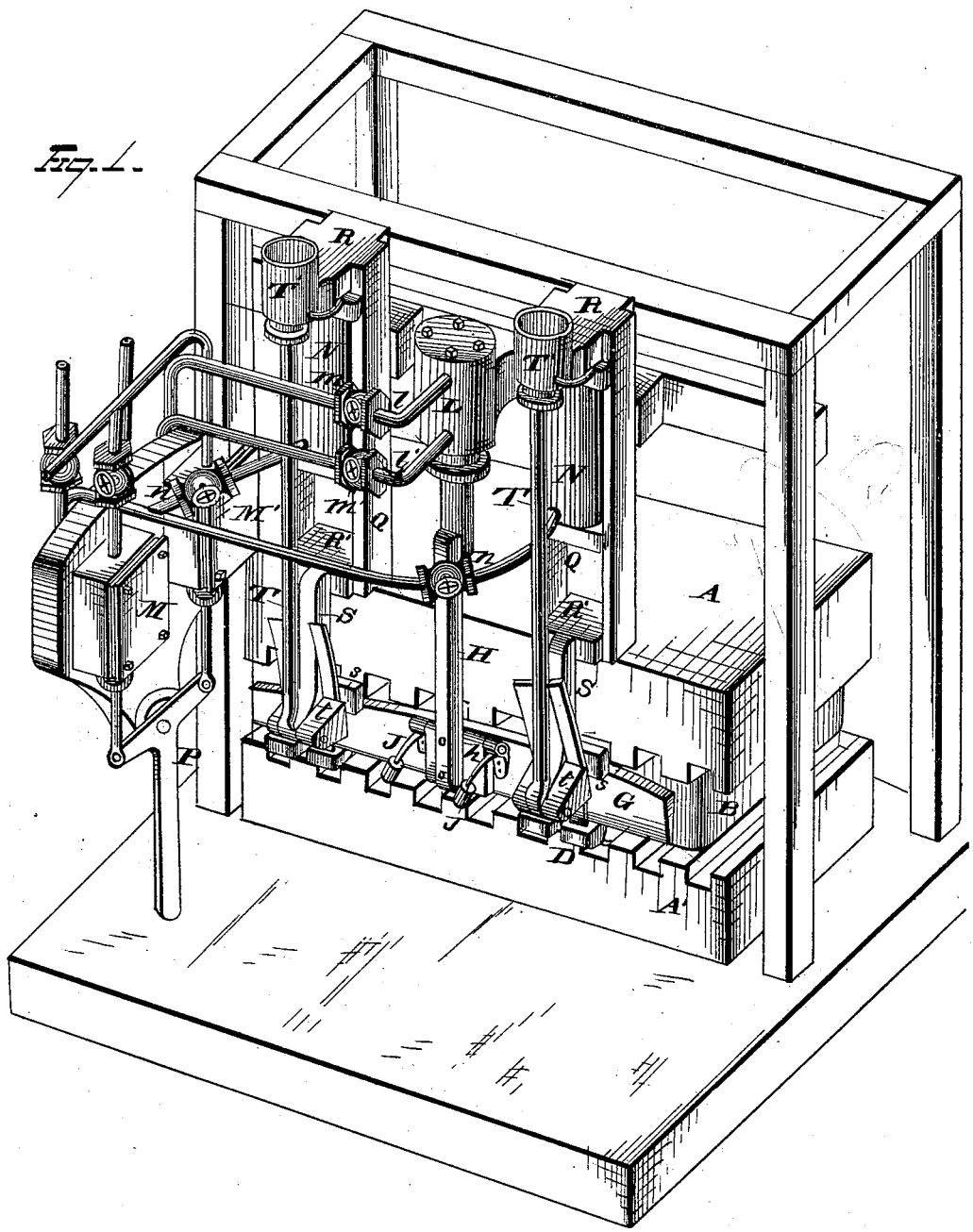
WITNESSES
Ed. J. Nottingham
A. W. Bright
INVENTOR
Samuel J. Chapman
By Leggatt and Leggatt
ATTORNEYS.
N. PETERS, PHOTO-LITHOGRAPHER, WASHINGTON, D. C.

2 Sheets—Sheet 2.
S. J. CHAPMAN.
Bale-Band Tighteners.
No. 196,431. Patented Oct. 23, 1877.
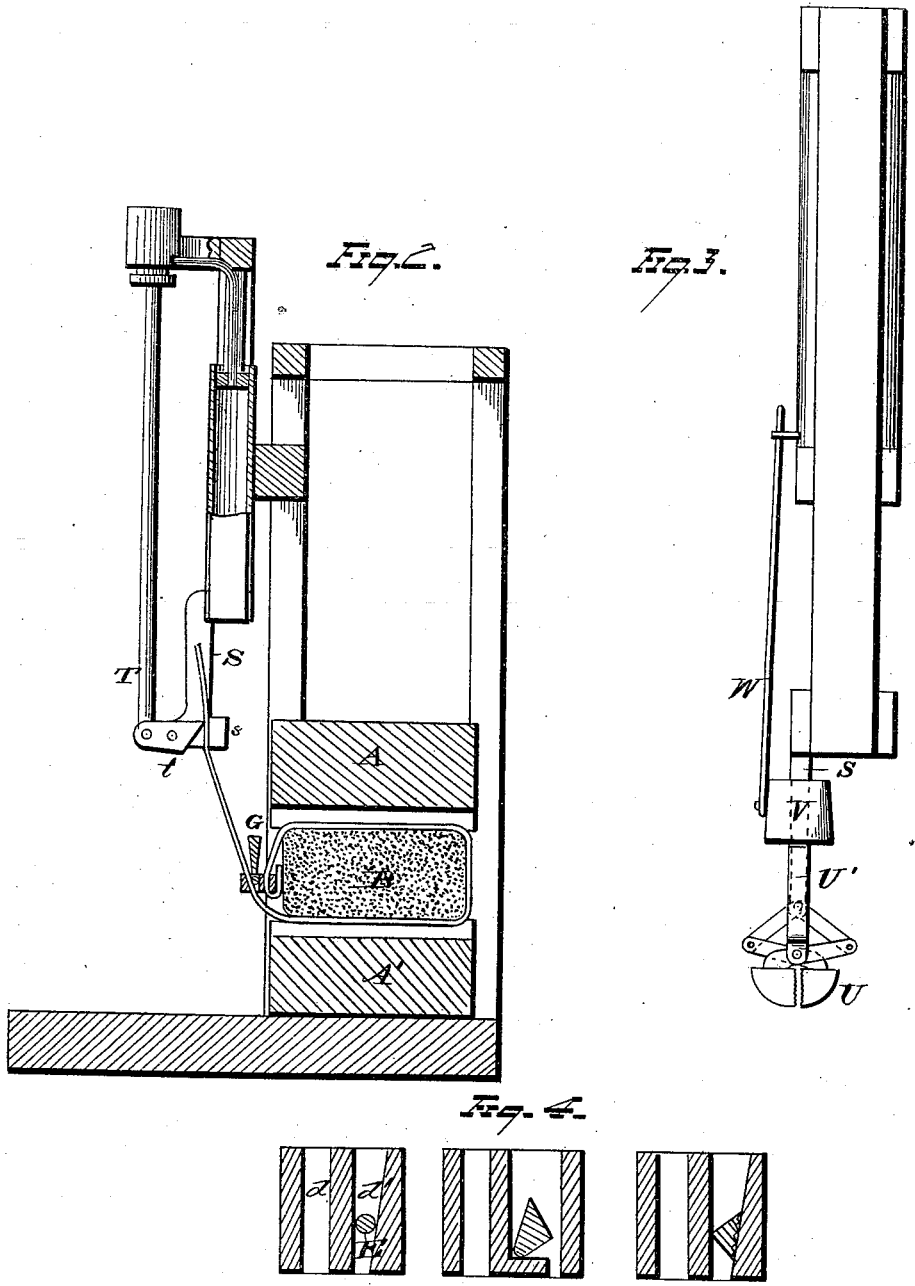

UNITED STATES PATENT OFFICE.

SAMUEL J. CHAPMAN, OF CHARLESTON, SOUTH CAROLINA, ASSIGNOR OF ONE-HALF HIS RIGHT TO DANIEL SEYMOUR SILCOX, OF SAME PLACE.

IMPROVEMENT IN BALE-BAND TIGHTENERS.

Specification forming part of Letters Patent No. 196,431, dated October 23, 1877; application filed April 7, 1877.

*To all whom it may concern:*

Be it known that I, SAMUEL J. CHAPMAN, of Charleston, in the county of Charleston and State of South Carolina, have invented certain new and useful Improvements in Bale-Band Tighteners; and I do hereby declare the following to be a full, clear, and exact description of the invention, such as will enable others skilled in the art to which it pertains to make and use it, reference being had to the accompanying drawings, which form part of this specification.

My invention relates to improvements adapted to be applied to steam, hydraulic, or other bale-presses, whereby the bands of cotton or other baled goods may be tightened and fastened, as desired; my object being to tighten the bands of a bale by such a direct application of power that an immediate, simultaneous, and equal force may be brought to bear upon all the several bands as the latter are drawn into proper tightness about the bale, and then secured by self-fastening ties.

I provide a series of steam-cylinders supported on a frame-work above the horizontal plane of the upper platen of a press, each of said cylinders being respectively connected, by suitable engaging mechanism, with the several bands of a bale, and adapted to tighten them by steam-power introduced therein by pipes leading from respective valve-chests, controlling the steam. In the central front of this frame-work a cylinder is also placed, whose connecting-rod is hinged to a bar extending the horizontal length of the press-platens, so as to rest upon the upper faces of all the several band-ties, and hold them in proper position without vertical displacement, while the draft-cylinders on either side of this stop-cylinder operate to tighten the bands in their several ties.

Both the stop-cylinder and also all the draft-cylinders connect, by suitable pipes, with respective valve-chests, and are so arranged that when the piston of the stop-cylinder is on the downstroke that of the draft-cylinders will be on the upstroke. By thus reversing the vertical movement of the pistons of the draft-cylinders on the one hand, and that of the stop-cylinder on the other hand, their respective connecting-rods alternate in their movement, so that the stop-plate is borne down and firmly maintained upon the several bale-ties simultaneously with the tightening of the bands by the draft mechanism.

A double-acting lever operates the motion-valves in the respective valve-chests, so that by moving this single lever the above-described double action takes place.

These valve-chests may connect with any steam-generating mechanism by pipes leading between the two; but it will be found best to use steam either from the press-cylinder or the boiler.

In practice, I prefer to take steam from the press-cylinder, as the tightening operation does not take place till after the bale is compressed, and the withdrawal of a small volume of steam therefrom at such a time subsequent to the compression will not interfere with the working of the press. I also provide auxiliary cylinders, which take their steam through the pistons of the draft-cylinders, and so arranged that the free ends of the bands are clamped by engaging mechanism simultaneously with the rise of the piston-rods, which, by connecting means, tighten the several bands. Upon drawing the latter sufficiently tense, the automatic bale-tie fasteners lock the bands against withdrawal from their former tightened state; and as steam exhausts from the several draft-cylinders, their respective auxiliary griping-cylinders are correspondingly exhausted, and the griping mechanism automatically releases the bands.

The said draft-cylinders and auxiliary band-griping cylinders all have open upper heads, so when the steam is introduced in the lower part of the cylinders beneath the piston-heads, the vertical rise of the latter fully operates, while upon exhaust, the gravity of the pistons and their lower connecting mechanism cause their immediate and voluntary fall or downstroke.

Hand-valves are provided on the steam-pipes leading into the stop and the several draft-cylinders, so that the volume of steam may be therein controlled for each respective cylinder independently of the others, and thus a greater steam-pressure can be brought to bear upon some of the bands than upon others, if for any reason it should thus be desired. If necessary or called for, the several or any of the pistons may be loaded by weights, so that the respective cylinders may not have an excess of power.

The stop-bar is provided with weighted lever-arms projecting from a front-plate, which latter directly connects the hinged connecting-rod of the stop-cylinder with the said bar, so that the tendency of the latter is always to be pressed inward against the bands of the bale; and by reason of the stop-bar being hinged, it can be swung in or out, corresponding to a wide or narrow bale, and thus be adjustable horizontally to or from the platens of the press.

Referring to the drawings, Figure 1 is a view, in perspective, of my device as applied to the rough skeleton of any press, two of the draft-cylinders only being shown. Fig. 2 is a view showing one of the draft-cylinders, with connecting parts in vertical section. Fig. 3 is a detail view of one of the draft-cylinders, having a modified form of band-griping mechanism. Fig. 4 shows different kinds of automatic tie-fasteners.

A A' represent, respectively, the upper and lower platens of any press suitable for baling cotton or other balable goods, between which platens is shown a bale, B, compressed and in the act of being bound by the bands.

D are the ties, made as rectangular oblong pieces of metal, having two slots, $d$ $d'$, running longitudinally with their body. The inner, or slot $d$ nearest the bale, has straight parallel sides; and in this slot one end of the band is inserted and turned by a return bend, as is usual, flat against the bale. The remaining or outer slot, $d'$, has an inclined or wedge-shaped wall, which is shown as one form of making this slot of greater cross-dimension at its one end opening than at its other.

The independent roller E, working loosely up and down in the slot $d'$, serves to secure the band, since free opportunity is afforded to draw the band tighter as the latter moves in a line toward the greater upper opening of the slot; and at same time any tendency on its part to withdraw or move downward in a direction toward the lower and smaller opening of the slot is at once met by the frictional resistance of the roller as it is jammed in between the band and the wall of the said slot. Modified forms of this self-locking mechanism are also shown in Fig. 4, which may be used, if preferred, in substitution for the roller before described.

If desired, in order to keep the fasteners in their slot—as, for instance, before the tie is used—I may in any suitable way close the larger opening of the slot. Thus paper may be pasted over it, or guards may be provided on the upper face of the tie, which can be readily bent over, so as to be parallel with the latter, and effectually guard the locking-roller or wedge from coming out from their slot.

G represents my stop-bar or plate, which is used to resist the tendency of the ties D to move or rise under the force of the tightening process, and is hinged to the connecting-rod H through the medium of the plate $h$, so that it may swing freely in a vertical plane, and thus reach under the upper platen in case the bale is not in flush outer line with the same. Weighted lever-arms J act as lateral presser mechanism to hold the stop-plate close against the bands.

This stop-plate is controlled by the connecting-rod H, as the latter is actuated by a piston, which, in turn, is operated in the cylinder L. This latter cylinder has the usual steam-pipes $l$ $l'$, each provided with valves $m$ $m'$, so that their passages can be controlled independently of the regular-motion valves in the respective valve-chests $m$ $m'$. These latter valves operate the feed and exhaust ports of the steam-pipes for, respectively, the above-described stop-cylinder L, and also the several draft-cylinders N, and are jointly worked by the single pivoted lever-bar P. As the lever is swung to the right or to the left the feed and the exhaust of the two cylinders are operated, as is afterward described.

Stop-valves $n$ are also provided on the steam-pipes connecting with the draft-cylinders, so that the latter may be regulated, in the amount of steam handled, independently of the motion-valves. The usual exhaust-steam-feeding pipes are used, so that the entire attachment may be applied to any ordinary press already made, by simply running out steam-pipes from the cylinder or boiler of the engine into the steam-chests respectively incident to the stop and draft cylinders.

The operation of the foregoing-described parts is as follows: The goods to be baled being compressed with the several bands in place about the same, and the tie adjusted centrally of the bale, as shown, with the two ends of the band inserted in their corresponding tie-slots, the motion-valve lever P is moved so as to exhaust the stop-cylinder, and the stop-bar is lowered to the extreme down-stroke of its connecting piston, which distance is definitely arranged, so that the lower or bearing face of the stop-bar will be in a horizontal plane passing centrally through the bale. The bands being loose, if any of the ties are too high, they will be readily forced down, while if too low they will be brought up, as the bands are tightened by throwing the lever P in the opposite direction, so as to feed steam respectively into the stop and also the several draft-cylinders. The steam thus introduced into the stop-cylinder over the head of its piston strongly presses the stop-bar down against the ties, and resists the action of the draft-cylinders drawing in the opposite direction. The fasteners of the ties are prevented from coming out of their wedge-shaped slot by the stop-plate covering sufficient of the latter in cross-measurement, even if the described guards were not on the ties.

Simultaneously with this action of the stop-cylinder, the pistons of the several draft-cylinders, having steam introduced beneath them, are driven up, carrying the guide-rods Q with them in their upstroke, which latter are provided with the upper buffer-blocks R, rigidly engaging with the piston-rods extended up through the cylinders. The lower extremities of these guide-rods on either side of the several cylinders have the lower buffer-blocks R', which, together with blocks R, serve as cross-pieces to hold the said rods together. The connecting-rods S, engaging with the lower cross-blocks R', draw up the engaging mechanism and tighten the bands as tense as desired. Upon operating the lever P back to its former position, exhaust occurs in all the cylinders, and the bands are locked by the self-fastening ties.

It is apparent that, instead of having a separate draft-cylinder for each band, one cylinder may engage with two or more bands, as shown in the drawing, where each cylinder operates two bands; and it is evident that, if desired, there may be but two draft-cylinders to a single press—one on either side of the central stop-cylinder.

The rack-bars s, secured to the rear side of the lower extremity of the connecting-rods S, may be of any length, corresponding with the number of bands to be griped by them, whether two, as shown in the drawing, or more or less. The pawls t also are made of suitable size, so as to engage with the respective number of bands and mesh them between them and the rack-bars. This band-griping mechanism is preferably used as shown in Fig. 2 of the drawings, though, if desired, I may employ the modified mechanism seen in Fig. 3.

The connecting-rod S has the described rack s, in which meshes the pawl t, pivoted to rod S, and having its lever-arm loosely connected with the vertical rod T, which latter is actuated by the auxiliary cylinder T', secured on the upper buffer-block R. This auxiliary cylinder partakes of the vertical movement of the piston in its respectively-connecting draft-cylinder, and, by means of a steam-pipe leading through the piston of the latter, steam is introduced beneath its own piston, and the latter is correspondingly operated simultaneously with the piston of the draft-cylinder. Thus the griping of the bands takes place as the latter are tightened, and upon being tightened and fastened are then automatically released. A similar result takes place when the lazy-tongs nippers (shown in Fig. 3) are used, the construction of which latter is as follows:

The rods S are secured to the upper joint of the toggle-lever nippers U, while the lower joint of the toggle-levers has secured thereto a secondary connecting-rod, U', whose opposite upper end supports a weight, V, and the two have attached to them a chain, rod, or other connection, W, which attaches them to the draft-cylinder. The nipper-jaws are adapted to close over the free extremity X of the band, and to slide freely up or down the same when not closed in frictional contact upon the band.

It is apparent that upon exhausting steam from the draft-cylinders, and the bands being all respectively fastened, steam may be independently admitted below the piston of the stop-cylinder, and the stop-bar will be raised sufficiently to clear the bale from the press and allow fresh goods to be introduced between the platens for compression. The foregoing operation of tightening and fastening the bands about the newly compressed bale is then repeated.

Having fully described my invention, what I claim as new, and desire to secure by Letters Patent, is—

1. The method of tightening bale-bands substantially as described, the same consisting in imparting pressure simultaneously to the upper ends of the several bands, and also imparting an equal or variable tension to the lower ends of the bands by independent steam-actuated pistons, and then automatically locking the ends of the bands, substantially as and for the purpose described.

2. A machine for tightening bale-bands, consisting, essentially, in the combination, with suitable connecting mechanism, as described, of a draft-cylinder and a stop-cylinder, the two latter, respectively, acting upon a band in opposite lines of direction of applied force, substantially as described.

3. The combination, with the draft and stop cylinders of a band-tightener, of duplex-valve mechanism and a single operating-lever, whereby the induction and eduction ports of said cylinders are alternately opened to the steam and exhaust ports in said valves, substantially as and for the purpose described.

4. In machinery for tightening and fastening bale-bands, the combination, with the draft and stop cylinders, of respective steam connecting-pipes, the latter provided with valves acting independently of the usual motion-valves in controlling the actuation of the pistons, substantially as described.

5. In machinery for tightening and fastening bale-bands, the combination, with the draft and stop cylinders, with their suitable connecting-pipes, of respective steam-chests, operated by motion-valves and a single actuating-lever, the same located at any desired distance from the said cylinders, substantially as described.

6. In machinery for tightening and fastening bale-bands, the combination, with a steam-cylinder and a rod connected with the piston, of a stop-bar hinged to said rod, whereby the lower and working face of the stop-bar is adapted to have a lateral movement to adjust itself to bales of different widths, substantially as described.

7. The combination, with the draft-cylinder, of an auxiliary cylinder and connecting mechanism, as described, whereby the band is simultaneously griped and tightened, substantially as described.

8. The combination, with the draft-cylinder and connecting mechanism, of a subsidiary cylinder for operating a pawl and rack engaging mechanism, which gripes the free end of the band while the latter is being tightened, substantially as described.

9. The auxiliary cylinder, located on the upper buffer-block of the draft-cylinder, and vertically adjustable with the frame-work of the same, in combination with the pawl-gripe mechanism, the latter automatically releasing the band when tightened and fastened, substantially as described.

In testimony that I claim the foregoing I have hereunto set my hand this 31st day of March, 1877.

SAMUEL J. CHAPMAN.

Witnesses:
T. MOULTRIE MORDECAI,
JENNINGS W. PERRY.